(12) United States Patent
Walters (10) Patent No.: US 8,865,781 B2
(45) Date of Patent: Oct. 21, 2014

(54) PROCESSING OF WASTE MATERIAL

(75) Inventor: Ian Walters, Wales (GB)

(73) Assignees: Haydale Limited, Wales (GB); Desso Group BV, Waalwijk (NL)

( * ) Notice: Subject to any disclaimer, the term of this patent is extended or adjusted under 35 U.S.C. 154(b) by 385 days.

(21) Appl. No.: 13/126,940

(22) PCT Filed: Nov. 6, 2009

(86) PCT No.: PCT/GB2009/002633
§ 371 (c)(1),
(2), (4) Date: Aug. 5, 2011

(87) PCT Pub. No.: WO2010/052478
PCT Pub. Date: May 14, 2010

(65) Prior Publication Data
US 2011/0288188 A1 Nov. 24, 2011

(30) Foreign Application Priority Data
Nov. 6, 2008 (GB) .................................. 0820342.4

(51) Int. Cl.
*B29B 17/02* (2006.01)
*B29L 31/00* (2006.01)
*B29B 17/04* (2006.01)
*B29K 75/00* (2006.01)
*B29K 95/00* (2006.01)
*B29K 23/00* (2006.01)
*B29K 27/06* (2006.01)

(52) U.S. Cl.
CPC ..... *B29B 17/0412* (2013.01); *B29L 2031/7652* (2013.01); *B29B 2017/0416* (2013.01); *B29L 2031/7322* (2013.01); *B29K 2075/00* (2013.01); *B29B 2017/0488* (2013.01); *B29K 2095/00* (2013.01); *B29K 2023/12* (2013.01); *B29B 2017/0241* (2013.01); *B29K 2027/06* (2013.01); *B29K 2023/06* (2013.01); *B29B 17/02* (2013.01); *Y10S 264/911* (2013.01)

USPC ................ 521/45.5; 521/40; 521/46; 521/47; 521/48; 521/49.8; 264/37.1; 264/37.28; 264/118; 264/122; 264/911; 241/68; 241/79; 528/502 R; 528/502 F; 528/503

(58) Field of Classification Search
CPC ................ B29B 17/02; B29B 17/0412; B29B 2017/0241; B29B 2017/0416; B29B 2017/0488; B29L 2031/7652; B29L 2031/7322; B29K 2023/12; B29K 2023/06
USPC ........ 521/40, 40.5, 41, 45.5, 46, 47, 48, 49.8; 528/480, 502 R, 502 F, 503; 241/68, 79; 264/36.1, 37.1, 37.28, 118, 122, 138, 264/140, 911, 913
See application file for complete search history.

(56) References Cited

U.S. PATENT DOCUMENTS 4,813,614 A * 3/1989 Moore et al. .................. 241/3
5,704,104 A 1/1998 Bacon et al.
(Continued)

OTHER PUBLICATIONS

International Search Report of International Application No. PCT/GB2009/002633, dated Mar. 1, 2010 (English Text).
(Continued)

*Primary Examiner* — Frances Tischler
(74) *Attorney, Agent, or Firm* — Fay Sharpe LLP (57) ABSTRACT

A method of processing waste carpet or matting material to separate constituent materials thereof, includes optionally drying the material and then cooling the material to a temperature at which at least one constituent material therein is embrittled. A mechanical force is applied to the cooled material causing the embrittled constituent material to break into fragments. Optionally, the material from the previous step is dried. The material is then separated to separate the fragments of constituent material from other constituent material. The carpet material can be initially shredded into coarse pieces. The procedure may be repeated optionally with different temperatures to selectively embrittle and fragment different components and facilitate their separation.

7 Claims, 3 Drawing Sheets

(56) References Cited

U.S. PATENT DOCUMENTS

| | | |
|---|---|---|
| 5,914,353 A | 6/1999 | Grizzle et al. |
| 6,182,913 B1 * | 2/2001 | Howe et al. ............ 241/1 |
| 2001/0009710 A1 | 7/2001 | Zegler et al. |
| 2005/0118386 A1 | 6/2005 | Desai et al. |
| 2006/0006564 A1 | 1/2006 | Maldas et al. |
| 2006/0086817 A1 * | 4/2006 | Kirchmer et al. ............ 238/1 |

OTHER PUBLICATIONS

Written Opinion of International Application No. PCT/GB2009/002633, dated Mar. 1, 2010 (English Text).

* cited by examiner

PROCESSING OF WASTE MATERIAL

TECHNICAL FIELD

The present specification relates to the processing of waste materials, especially layer materials comprising fibres such as carpet and the like, and particularly with a view to the recycling of one or more constituent materials thereof.

BACKGROUND

Carpet recycling has the potential to be of significant benefit, both environmentally and financially. At present many waste carpets are sent to landfill, which is undesirable as many of the materials used to make carpets are not biodegradable. Reuse of the materials reduces the amount of waste carpet which is sent to landfill. In addition, some of the constituent materials of carpets are costly to make or obtain, and accordingly there is a need for methods of recovering and reusing them.

The present proposals are applicable to the processing of any waste material, especially in layer form, containing more than one constituent material with at least one of them being fibrous. Typical flooring materials (carpets, matting) are constructed from constituent materials which include fibres. For example, carpet may be formed from woven fibres in which the weft lies flat, while the warp is looped to form an upstanding pile on the surface. Some woven carpets have a backing layer to stabilise the carpet, which may be for example a layer of adhesive. An alternative is "tufted" carpet which may have fibre tufts mounted into a primary backing fabric, which may be woven or non-woven. A bonding agent may anchor the tufts, and this bonding agent may be on a secondary backing fabric, which again may be woven or a non-woven such as felt. Carpet tiles are often similar to tufted carpets, except that the secondary backing is usually stiffer and not fabric, e.g. PVC or bitumen.

In general, typical materials for processing by the present methods ("materials of the kind described") comprise a combination of (a) fibre material—as (i) tufts or pile, and/or (ii) one or more fabrics, woven or non-woven—with (b) polymer-based matrix material which may be present (i) as or in one or more generally continuous layers (e.g. backing layer) and/or (ii) as a binder or adhesive in relation to fibre, and/or in relation to particulate material such as filler. Such materials may be waste carpet, mats, carpet tiles, matting, underlay or the like. For convenience the term "carpet" is used herein to comprehend these latter general types unless a specific context indicates otherwise.

It is known for materials recovered from waste carpet to be used in various ways. In a "closed-loop" recycling system, recovered materials are used to make a product similar to that they were recovered from. For example, carpet polymer backing and yarn (fibre) may be separated, broken down and reprocessed. The reprocessed backing material may be used in new carpet backing, and the reprocessed yarn made into more carpet facing. This recycling can be repeated more than once, depending on the materials. For example, carpet manufacturers already reuse nylon-6 (polycaprolactam) recovered from the fibres of waste carpet, to make new carpet fibre. Alternatively recovered materials may be reused to make different products: "downcycling". For example, nylon-6,6 recovered from carpet may be used to manufacture car parts, although most continues to go to waste (landfill). In any event, potentially recyclable material such as nylon-6 or nylon-6,6 needs to be recovered from waste carpet and isolated in a good usable state.

A variety of methods for the separation, recovery and reuse of constituent materials of carpet have been described. EP-A-0759456 exemplifies solvent-based methods, extracting polyamide from carpet residues using an extraction agent containing aliphatic alcohol. U.S. Pat. No. 5,535,945 describes reclaiming polymer fibres from carpet by shredding the carpet into strips and disintegrating the strips by hammering them against anvil elements.

U.S. Pat. No. 6,126,096 describes soaking used carpet pieces, chilling them to stiffen the backing material, and introducing the carpet pieces into a cyclonic comminuter which reduces the carpet pieces with separation of fibres from backing. The pre-soaking is disclosed as enhancing the separation of the component fibres in the comminuter, and also as initiating breakdown of latex backing.

U.S. Pat. No. 5,704,104 describes separation of pile and backing material of used carpet using dry ice pellets to freeze the binder material (usually latex) to a temperature that makes it brittle and easier to break up. The pellets also serve as abrasive agents, avoiding liquid or gritty residue because the pellets sublimate. The avoidance of using steam, chemicals or liquids is said to be advantageous to avoid the deposition of unwanted residues.

In view of the above, the aim or object of the present proposals is to provide new and useful methods for processing materials of the kind described, particularly with a view to the recycling of one or more constituent materials thereof. Preferred aims include economical and effective methods, adaptable for use with a variety of carpet materials and structures, which can be implemented without undesirable mess and waste, and which enable desired components such as polymeric fibres to be isolated without chemical deterioration.

OUR PROPOSALS

In a general aspect, our proposals herein relate to methods for processing materials of the kind described e.g. waste carpet in which the material—preferably after initial mechanical size reduction—is cooled to embrittle selectively one or more constituent materials therein and is then subjected to mechanical force, such as crush and/or impact and/or shear treatment, such as in a hammer mill or the like, sufficient to cause fragmentation or pulverisation of the embrittled material. Preferably the selectively embrittled material is or includes polymeric matrix, binder or adhesive component as mentioned above, which is thereby fragmented or pulverised selectively, relative to a fibre constituent which is not embrittled. Then the mixture of degraded component materials is subject to one or more separation steps. The above sequence of embrittlement and fragmentation may be repeated if appropriate, after or before separation and sorting.

In one particular aspect we have found that including a drying step when separating constituent materials of materials of the kind described is advantageous. For example, some constituent materials may be broken into fragments or powder while others remain as larger pieces or as fibres. The constituent materials may then be separated on the basis of their size and/or density as described in more detail below. We find that drying the constituent materials before separation increases the efficiency of separation. If the fibres are damp or wet when separated, the density of the materials may be increased, density differences between the materials may be changed and/or reduced, and they may stick together. For example, when fibres are wet or damp they tend to be relatively heavy. When dried they are relatively light and more readily separable, for example by airflow methods, from materials which have broken into fragments or powder.

Additionally, a drying step may introduce a static charge which leads the carpet fibres to gather together with other fibres of similar material, which further enhances their separability from other constituent materials, such as the residues of binders and adhesives.

The inventor has found that simply avoiding the addition of moisture may not be sufficient to produce this improved separation, and a step of actively drying the carpet material at this stage is beneficial. This is particularly significant with methods as in the above general aspect which employ cooling. The cold materials tend to capture moisture from the air, which when it thaws causes a wetting or dampening of the material.

Accordingly, in a first particular aspect the present invention provides a method of separating constituent materials of a material of the kind described, e.g. carpet, the method comprising the steps of:
- cooling the material to a temperature at which one or more of the constituent materials are brittle and one or more of the constituent materials are flexible or non-brittle;
- applying mechanical force to the cooled material to cause selectively the brittle constituent material or materials to break into fragments;
- drying the fragments of brittle constituent material or materials together with the flexible constituent material or materials; and
- separating the fragments of brittle constituent material or materials from the flexible constituent materials.

The inventor has also found that it is advantageous to include a drying step before the cooling step, as this can enhance the efficiency of the cooling process. This is believed to be because excess water can act as a heat sink. Accordingly, the method outlined above may include the additional step of drying the material before it is cooled. It will be understood that this initial drying step also is independently advantageous, with or without a drying step performed before the fragments are separated, and may itself contribute to enhanced separation. Accordingly, in a second aspect the present invention provides a method of separating constituent materials of a material of the kind described carpet, the method comprising the steps of:
- drying the material;
- cooling the material to a temperature at which one or more of the constituent materials are brittle and one or more of the constituent materials are flexible or non-brittle;
- applying mechanical force to the cooled material to cause the brittle constituent material or materials to break into fragments; and
- separating the fragments of brittle constituent material or materials from the flexible constituent material or materials.

It will be understood that this method may additionally include a step of drying the fragments together with the flexible constituent materials before the fragments are separated from the flexible constituent materials, which may enhance separation as described above.

Typically, most constituent materials of carpets are non-brittle at room temperature. Accordingly, it will be understood that the cooling in the present methods is such as to cause some of the constituent materials to become brittle.

Materials which are brittle at a given temperature are understood to be those which readily fracture, break or shatter at that temperature. Materials which are flexible at a given temperature are understood to be those which are not brittle at that temperature. Accordingly, flexible materials include those which may be plastically or elastically deformed without breaking. It is preferable that the flexible constituent materials remain substantially unbroken when the mechanical, impact or shear treatment in question is applied to the cooled material.

In the case of many constituent materials of carpet, particularly polymeric materials, the materials are brittle when they are below their glass transition temperature ($T_g$). Therefore, it will be understood that the cooling step may involve cooling the carpet to a temperature below the glass transition temperature of some of its constituent materials, but above the glass transition temperature of other of its constituent materials. Typically, this involves cooling the materials at least down to −10° C., −20° C., −30° C., −40° C., −50° C., −60° C., −70° C., −80° C., −90° C., −100° C., −110° C., −120° C., −130° C., −140° C. or −150° C. The temperature is chosen in dependence on which constituent material is to be made brittle.

As described in more detail below, materials of the kind described e.g. carpets may be made of several constituent materials which become brittle at different temperatures, including e.g. different glass transition temperatures. Accordingly, it will be understood that the methods of the present invention may comprise further rounds of cooling and separation, adjusted to provide separation of further constituent materials of the carpet. Accordingly, the methods herein may further comprise steps of
- recovering the flexible constituent material or materials, or fragments of previously embrittled constituent material or materials;
- cooling the recovered flexible constituent material or materials, or the recovered fragments of brittle constituent material or materials, to a second temperature at which one or more of the cooled constituent materials are brittle and one or more of the cooled constituent materials are flexible/non-brittle;
- applying mechanical force to the cooled constituent materials to cause the brittle constituent material or materials to break into fragments; and
- separating the fragments from the residual flexible constituent material(s).

Preferably, this second round of cooling and separation includes a step of drying the constituent materials before cooling and/or before separation, as described above.

It will be understood that any number of further rounds of cooling and separation may be performed, depending on the number of constituent materials and on which of them it is desired to recover. Preferably, each further round of cooling and separation includes a step of drying the constituent materials before cooling and/or before separation, as described above.

For reuse, it is favourable to separate the carpet into individual (single) constituent materials. To enable separation of individual materials, the material is cooled to a temperature at which only one constituent material is brittle (preferred), or to a temperature at which only one constituent material is flexible. In each round of cooling and separation, the carpet may be cooled to a successively lower temperature. It may be the flexible constituent materials which are recovered and subject to one or more further rounds of cooling and separation.

The insight that constituent materials may selectively be made brittle by the selection of an appropriate temperature, as discussed above, is independently useful, e.g. even in the absence of drying steps as discussed above. Accordingly, in a further aspect the present invention provides a method of recovering a single constituent material from a material of the kind described e.g. carpet, comprising:

cooling the material to a temperature at which only one of its constituent materials is brittle, or to a temperature at which only one of its constituent materials is flexible;

applying mechanical force to the cooled material to cause the brittle constituent material or materials to break into fragments; and separating the fragments from the residual flexible constituent material or materials.

Including a drying step before cooling and/or before separation may be preferred, to provide the advantages discussed above. It will be understood that the foregoing discussion of optional and preferred features of the previous methods apply equally to this method. In particular, it may be desirable to include further rounds of cooling and/or of separation, as described above.

As discussed above, including one or more drying steps when separating the constituent materials of a carpet can be advantageous, as this may result in an increase in the efficiency of cooling and/or separation. In particular, a drying step is useful when separating fibres because drying may introduce static charges which cause the fibres to gather together, which enhances their separation from other constituent materials. Accordingly, it will be understood that including a drying step may be advantageous even in separation methods which do not involve cooling the carpet to cause some of its constituent materials to become brittle. In a further aspect, then, the present invention provides a method of separating constituent materials of materials of the kind described e.g. carpet, comprising the steps of:

providing a mixture of fragments and/or fibres of the different constituent materials;

drying the mixture; and separating the fragments and/or the fibres of one or more constituent materials from the fragments or fibres of the other constituent material or materials.

The provision of the mixture of fragments and/or fibres of different constituent materials may be by the methods employing cooling and the application of mechanical force as described above. However, the mixture may also be provided by any other method of breaking up the carpet, for example by separation of backing materials such as a bonding agent or adhesive from fibrous constituent materials such as the materials of the tufts of the carpet by a mechanical process not employing cooling, for example as disclosed in U.S. Pat. No. 5,535,945.

According to a further aspect of the present invention, there is provided apparatus for performing any of the methods as proposed herein. The apparatus may comprise one, more or all of:

cooling apparatus for cooling the carpet, which may include a cooling chamber or a cooling tunnel;

fragmentation apparatus for applying mechanical force to the cooled carpet for breaking the brittle constituent material or materials into fragments as described above;

one or more dryers for drying the material, or the fragments of brittle constituent materials together with the flexible constituent material or materials, as described above; and a separator for separating the fragments of brittle constituent material or materials from the flexible constituent material or materials.

Preferably, the apparatus includes process conveyors to move the material one part of the apparatus to the next.

Embodiments of the present invention will now be described in more detail by way of example and not limitation.

DETAILED DESCRIPTION

Cooling

The carpet may be cooled by any suitable method, apparatus and coolant. Dry cooling is strongly preferred. Liquefied gas is preferably fed as coolant, because it is readily available, enables low temperatures and leaves no residues. Preferred gases include liquid nitrogen and carbon dioxide. Coolant can be jetted or sprayed onto the material e.g. in a cooling chamber or a cooling tunnel, desirably in a continuous process as it is driven through.

As discussed above, the method may include cooling to a temperature at which some of the constituent materials are brittle and some are flexible. The temperature the carpet is cooled to may be selected according to which constituent material or materials it is desired to separate or recover. For example, if it is desired to recover a constituent material which becomes brittle at a higher temperature than the other constituent materials, the temperature to which the carpet is cooled should be a temperature at which the constituent material to be recovered is brittle, but the other constituent materials remain flexible. For example, this may be a temperature below the glass transition temperature of the constituent material to be recovered, but above the glass transition temperatures of the other constituent materials. Similarly, if it is desired to recover a constituent material which becomes brittle at a lower temperature than the other constituent materials, the temperature to which the carpet is cooled should be a temperature at which the constituent material to be recovered remains flexible, but the other constituent materials are brittle. For example, this may be a temperature below the glass transition temperature of the other constituent materials, but above the glass transition temperature of the constituent material to be recovered. It will be understood that this discussion applies equally when it is desired to separate a fraction containing more than one constituent material. In such cases, the temperature selected should be one at which some of the constituent materials are brittle, and some are flexible.

The selection of temperatures is discussed in more detail below, in relation to particular constituent materials of carpet which may be separated according to the present invention.

The temperature the material is cooled to is controlled by adjusting the cooling process. Different liquefied gases may be used. Liquid nitrogen allows the carpet to be cooled to temperatures as low as about −150° C., and carbon dioxide allows the carpet to be cooled to temperatures as low as about −50° C. The temperature may also be controlled by adjusting the residence time in the cooler (any of cooler length, conveyor speed, and optional waiting time).

Cryogenic cooling tunnels are known per se, and may include a conveyor belt or screw.

The cooling apparatus may be fitted with temperature sensors to ensure that it is operating at a suitable temperature for cooling the material to the desired temperature.

Drying

Drying steps in the methods may use any suitable method of drying. Convective drying is preferred. For example, heated air may be passed over the material to dry it.

The drying may take place in a drying chamber, or tunnel with a conveyor. Drying gas, e.g. warm (above ambient temperature) dry air, may be directed into the drying chamber or the drying tunnel. The heated air used for drying may be a by-product of another step in the method. For example, hot air may be generated from frictional heat when initially shredding the material as discussed below. The hot air may be filtered and/or heated further before it is used to dry the carpet.

Venturi formations in the process path may be used to draw air to the drying location. The material conveyor or support may be vibrated or otherwise agitated to improve exposure of the material.

The air used in drying may be re-circulated into the drying cycle. Preferably, the re-circulated air is filtered, dried and/or heated before it is directed back to the drying chamber or drying tunnel. Heating of the air used for drying or of the dryer may be by any suitable method of heating e.g. solar panels.

Breaking the Brittle Materials (Fragmentation)

The constituent materials which are brittle following the cooling step may be broken by any suitable method of applying mechanical force. For example, a mill such as a hammer mill may be used to break the brittle material into fragments. Depending on the material, other apparatus such as rollers, grinding mills and granulation mills may be effective.

During this stage, it may be desirable to perform additional cooling by providing additional coolant. This helps to keep the brittle constituent materials brittle. Additionally, it may also drive out oxygen and reduce the risk of fire. Hammer mills adapted for cryogenic operation with feeds for liquid nitrogen are known and are desirably used.

Separation

Any suitable method may be used for separating the flexible constituent materials from the fragments of brittle constituent material. Preferably, the separation method separates components on the basis of their size, weight and/or density.

A preferred method of separation uses an air classifier. Swirls or cyclones of air selectively lift the less dense constituent materials, such as the flexible constituent materials which may be fibres. The fragments, in contrast, are scarcely lifted by the air.

In a known manner, the selectively separated materials can then be directed into respective separately-conveyed product or by-product streams.

Alternatively, density-based separation may be used. The flexible and brittle constituent materials may be vibrated on a moving bed which causes the less dense constituent materials such as fibres to rise to the top.

If the constituent materials are electrically charged, they may be separated on the basis of their charge. For example, charged constituent materials may be caught on a charged screen or surface, or a charged element or electron beam may be used to deflect charged materials away from uncharged materials, for example when the constituent materials are falling.

Additional Steps

It may be desirable to cut the material e.g. carpet into smaller pieces before it is processed by the methods of the present invention, and accordingly the methods may include an initial step of cutting or shredding the material. Similarly, the apparatus of the present invention may include a shredder, which has blades to cut the carpet into pieces of the desired size. Individual shredders switch for this are known, e.g. the Tyrannosaurus available from BMH Enviro (Finland) which can reduce material to an output size of about 50 mm reliably in one pass.

Preferably, the material is cut or torn into shreds or pieces of maximum dimension from 20 or 50 to 300 mm. Water may be added to assist the shredding process. It may usefully
  lubricate the shredding;
  avoid overheating (fire risk);
  prevent dust release.
The water is environmentally harmless and may be recycled in the process. Its residues on the shreds can be removed by subsequent drying as mentioned above.

It may also be desirable to remove metal impurities from the carpets during the methods of the present invention. This may be done by one or more magnets. These magnets may be used at any stage in the process, but in particular may be used after the optional initial shredding step and/or after fragmentation.

As discussed above, the methods of the present invention may include one or more further rounds of cooling and separation, to recover further constituent materials. In general, these further rounds are similar to the initial rounds of cooling and separation described above. However, the steps of cooling, applying mechanical force and separating could be performed simultaneously, for example in a centrifugal grinder at a suitable temperature for causing some of the constituent materials to be brittle while others are flexible.

Indeed, it will be understood that even in the first round of cooling and separation the steps of cooling, applying mechanical force and separating could be performed simultaneously, for example in a centrifugal grinder at a suitable temperature for causing some of the constituent materials to be brittle while others are flexible.

Construction of Carpets

Carpets may be constructed as woven carpets, tufted carpets or carpet tiles, as described above in the background section.

The tufts on the surface of the carpet (whether the carpet is woven, tufted or a carpet tile) are typically made from fibres of polypropylene, nylon-6 or nylon-6,6, polyethylene, polyester, wool or cotton, or a combination of any of the above materials. Accordingly, any of the above may be a constituent material of a carpet.

In woven carpets, it is typical that the fibres the carpet is woven from are also formed from the materials listed above for the tufts. When a backing layer is employed to stabilise a woven carpet, typically synthetic latex compounds are used with a solid filler such as chalk or fly ash. An example synthetic latex compound which may be used is SBR (carboxylated styrene butadiene copolymer) or NBR (nitrile butadiene rubber). Alternatively, thermoplastic polymers may be used as hot melt adhesives. Examples of such polymers include polypropylene (PP) and polyethylene (PE). Sometimes, polyvinyl chloride (PVC) or polyurethane (PU) may be used.

In tufted carpets, typically the primary backing fabric is formed from fibres of polypropylene, nylon-6 or nylon-6,6, polyethylene, polyester, wool or cotton, or a combination of any of the above materials. The backing layer may be fabric, and may be woven or non-woven. An example of a non-woven fabric formed from fibres is felt. The bonding agents which may be used to anchor the tufts to the primary backing layer include SBR, PVC, PU or hot melt adhesives such as PP or PE. As described above, the bonding agent may be anchored on a secondary backing layer. Typically, the secondary backing may be formed from fibres of hemp, jute, polypropylene, nylon-6 or nylon-6,6, polyethylene, polyester, wool or cotton, or a combination of any of the above materials. The secondary backing layer may be fabric, and may be woven or non-woven.

Carpet tiles are constructed similarly to the tufted carpets described above, except for the secondary backing layer. Typically, the secondary backing layer of a carpet tile is from 2 to 4 e.g. 2.5 mm thick. Typically it is made from PVC, bitumen, PP, PE, SBR or PU, or a combination of the above constituent materials. In some carpet tiles, the secondary backing layer is stabilised or strengthened by the inclusion of filler, such as fibreglass which may be in the form of fibreglass scrim.

As discussed above, the temperature the carpet is cooled to is selected based on which constituent material or materials it is desired to recover. Typically, in the first round of cooling, a temperature in the range −15° C. to −30° C. may be employed, at which thermoplastic materials such as PP, PE and bitumen may be brittle. When the mechanical force is applied, these brittle materials may be broken into fragments or particles while the carpet fibres remain intact. The following separation step (preceded by an optional drying step) separates the fragmented materials from the carpet fibres.

A further round of cooling and separation may be performed on the separated fragments. Alternatively, they may be re-used without further separation as primary or secondary backing in new carpet tiles. The fibres may be subjected to a further round of cooling and separation, for example to separate different fibre constituent materials (for example, to separate wool from nylon, or nylon-6 from nylon-6,6).

As a more specific example, a typical carpet tile may be made from nylon tufts, a polypropylene primary backing layer, an SBR bonding agent with calcium carbonate filler to anchor the tufts, and a secondary backing layer of bitumen stabilised with fibreglass. A first round of cooling, to a temperature in the range −15° C. to −30° C., would cause all the components apart from the nylon to become brittle (the calcium carbonate and fibreglass are brittle at room temperature). The embrittled polypropylene, SBR and bitumen, along with the calcium carbonate and fibreglass would be broken into fragments, leaving the nylon fibres intact. A separation step as described above, optionally preceded by a drying step, allows separation of the nylon fibres from the fragments. The fragments of the constituent materials can be used to form a high quality primary or secondary backing layer in new carpet tiles. The separated nylon fibres may be re-used without further separation, or a further round of cooling and separation may be used to separate nylon-6 from nylon-6,6.

A second example is based on a similar carpet tile, made from nylon and wool blend tufts, a polypropylene primary backing layer, an SBR bonding agent with calcium carbonate filler to anchor the tufts, and a secondary backing layer of bitumen stabilised with fibreglass. A first round of cooling, again to a temperature in the range −15° C. to −30° C., preferably about −30° C., would cause all the components apart from the nylon and the wool to become brittle (the calcium carbonate and fibreglass are brittle at room temperature). The embrittled polypropylene, SBR and bitumen, along with the calcium carbonate and fibreglass would be broken into fragments, leaving the nylon and wool fibres intact. A separation step as described above, preceded by an optional drying step, allows separation of the nylon and wool fibres from the fragments. A second round of cooling, performed on the nylon and wool fibres, embrittles the nylon which can then be fragmented and separated from the wool which remains fibrous. The recovered nylon may be re-used without further separation, or a further round of cooling and separation may be used to separate nylon-6 from nylon-6,6.

Example Process and Apparatus

Figure 1:
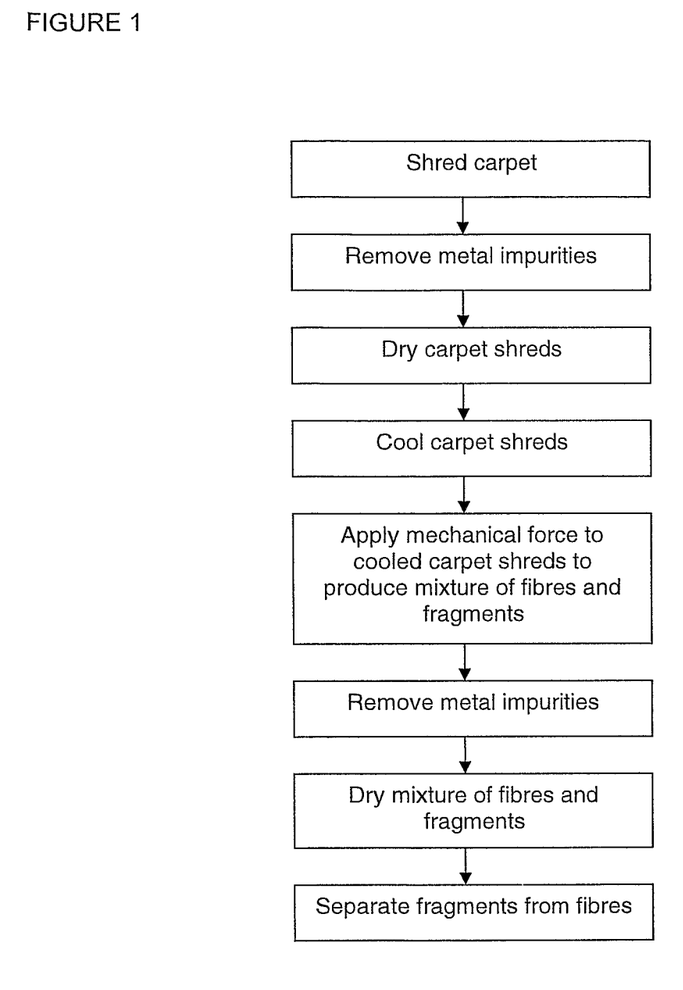
FIG. 1 shows a process of separation embodying the present proposals.

An example process for separating constituent materials of carpet is illustrated in FIG. 1. Suitable apparatus for the process is illustrated schematically in FIG. 2.

Figure 2:
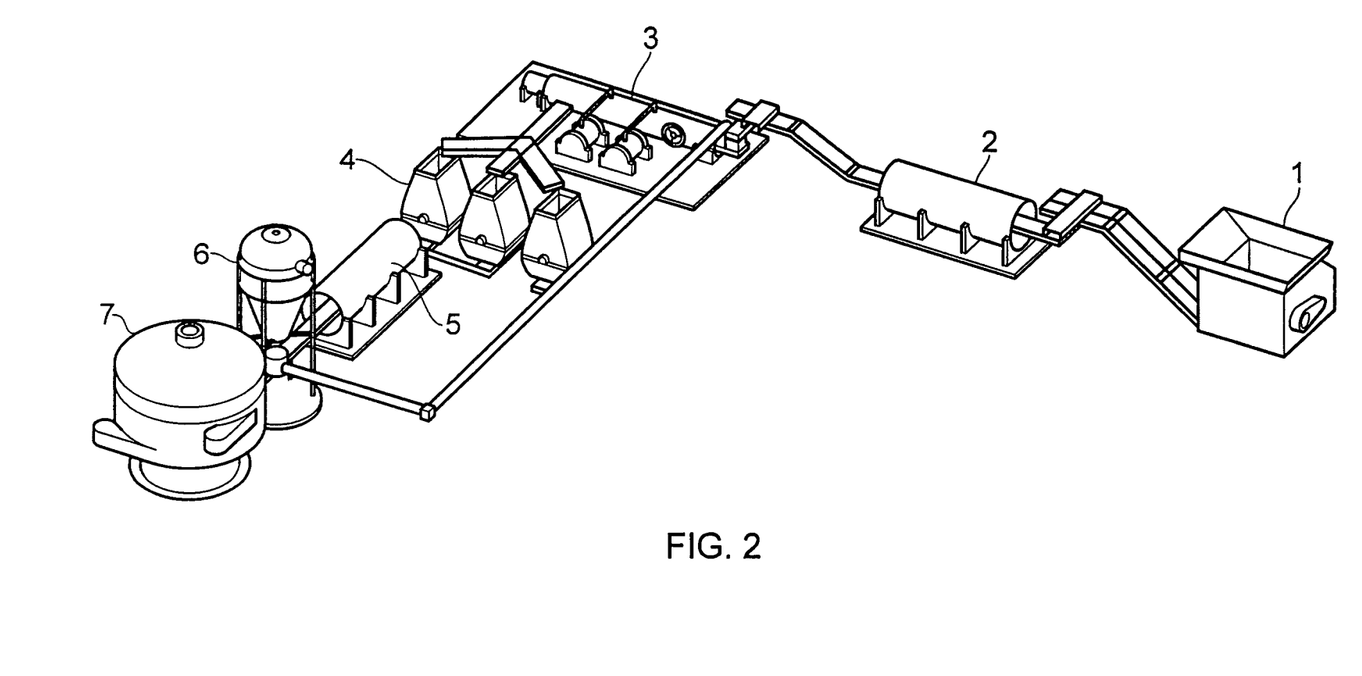
FIG. 2 shows schematically apparatus for performing the process of FIG. 1.

Firstly, the carpet to be recycled is cut into pieces approximately 100×150 mm, in a rotary shredder 1. This shredding is an ambient mechanical process. Water is added as a lubricant, and also acts to suppress dust produced by the shredding and reduce fire risk. The carpet shreds are carried out of the shredder on a transfer conveyer 21 and past a magnet 8 to remove metal impurities. Next, the shreds are dried by passing them through a dryer tunnel 2 on a dryer conveyor 22. The dryer 2 passes hot air (deriving heat from the shredder 1) over the carpet shreds on the conveyor. The conveyor may be vibrated to enhance the drying.

Next, the shreds are subjected to cooling to a temperature at which one or more of the constituent materials is brittle and one of more of the constituent materials is non-brittle. This is done in a cooling tunnel 3. The conveyor 22 feeds the dried shreds to an intake hopper of the cooling tunnel, and an internal screw carries them through it at a predetermined rate. Liquid nitrogen from storage 31 is sprayed in at intervals along the length and sensors measure the operational temperature. After cooling, the cold shreds are transferred by further transfer conveyor 23 to a set of hammer mills 4, where the brittle constituent materials are fragmented and the flexible constituent materials remain intact. To increase throughput, multiple hammer mills 4 are provided (with a spare mill 4a to enable servicing without stopping the process). Liquid nitrogen is fed to the hammer mills 4 for cryogenic grinding, in a manner known per se.

Next, the gradually warming mixture of flexible constituent materials and fragmented constituent materials is dried again in a second dryer 5, similar in principle to the first. This removes water initially gathered as frost on the cold material. Operation heat from the hammer mills 4 may be used to warm air for the dryer. The comminuted mixture is fed into one or more cyclone air classifiers 6 to separate the fragments from the fibres, and optionally also the fragments from one another on the basis of their different particle sizes or densities. The classifier 6 may retain the coarser fragments, while smaller fragments are lifted away. The fibres also clump together because of static charges accumulated in the second drying step, which makes them easier to separate from the fragments. Dust can be collected in a bag filter. Fibres and classified particles can be separately diverted and collected using known means.

Figure 3:
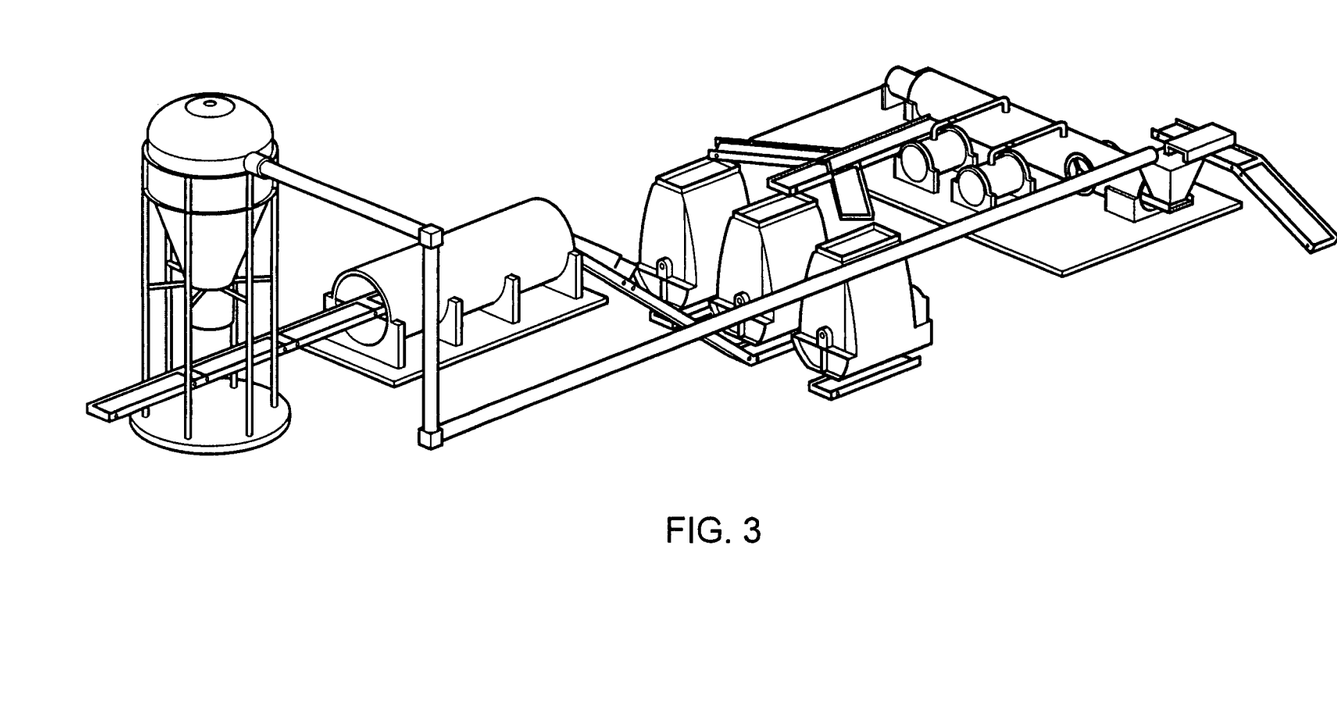
FIG. 3 shows a supplementary separation process.

Supplementary separation may be performed. One option is to subject the processed material, or a particular collected fraction of it, to further cooling and fragmentation. FIG. 3 shows one option for this schematically in relation to a basic process, with a recirculation line 9 from the cyclone classifier 6 back to the intake of the cryogenic cooler 3. FIG. 2 shows the same option in the full processing line.

For example the separated fibres may be cooled again for selective embrittlement and again cryogenically hammer-milled to effect further separation. The mixture of fragments and fibres is then dried and separated. This may use a semi-batch process. An additional downstream cooling/milling installation can be used as an alternative to recirculation.

Thus, another possibility is a supplemental centrifugal grinder 7, shown schematically in FIG. 2 downstream of the classifier 6, providing grinding at controlled temperature with selective embrittlement and enabling further separation, e.g. of face fibres from residual backing materials.

The invention claimed is:

1. A method of processing waste carpet or matting material to separate constituent materials thereof, comprising steps of:
    (a) drying the material;
    (b) cooling the material to a temperature below −100° C. at which at least one constituent material is embrittled or made brittle and at least one constituent material remains flexible or non-brittle;
    (c) applying mechanical force to the cooled material selectively causing the at least one brittle constituent material to break into fragments;
    (d) drying the fragments of the at least one brittle constituent material together with the at least one flexible constituent material from step (c);
    (e) separating the material to separate said fragments of the at least one brittle constituent material from the at least one flexible constituent material.

2. A method according to claim 1 in which a fibre or tuft constituent material not embrittled by said cooling is separated from said fragments in the separation step.

3. A method according to claim 1 in which nylon fibres of the material are separated from a backing layer of woven or non-woven polymer material which is embrittled and fragmented in the process.

4. A method according to claim 1 in which in the cooling step, thermoplastic constituent material is embrittled.

5. A method according to claim 1 in which a polymer recovered from the separation is subsequently re-used, optionally after depolymerisation.

6. A method according to claim 1 in which, in a preliminary step, the material is subjected to shredding to produce working pieces for said cooling (b).

7. The method of claim 5 wherein the polymer comprises nylon.

* * * * *